United States Patent
Hamburg et al.

(10) Patent No.: US 7,062,497 B2
(45) Date of Patent: Jun. 13, 2006

(54) MAINTAINING DOCUMENT STATE HISTORY

(75) Inventors: Mark Hamburg, Scotts Valley, CA (US); Glenn G. Gilley, Mountain View, CA (US); Andrei M. Herasimchuk, Palo Alto, CA (US); Katja Rimmi, Half Moon Bay, CA (US); Robert J. Pappas, Apple Valley, MN (US); Eric A. Scouten, St. Paul, MN (US)

(73) Assignee: Adobe Systems Incorporated, San Jose, CA (US)

( * ) Notice: Subject to any disclaimer, the term of this patent is extended or adjusted under 35 U.S.C. 154(b) by 535 days.

(21) Appl. No.: 09/010,801

(22) Filed: Jan. 22, 1998

(65) Prior Publication Data

US 2001/0049704 A1    Dec. 6, 2001

(51) Int. Cl.
*G06F 17/30* (2006.01)
*G06F 15/00* (2006.01)
*G09G 5/02* (2006.01)
*G09G 5/00* (2006.01)

(52) U.S. Cl. .................... 707/101; 715/530; 715/531; 715/539; 715/540; 345/594; 345/610

(58) Field of Classification Search ............... 707/101, 707/530, 531, 502, 513, 501, 501.1, 511, 707/539, 515, 540; 345/438, 348, 349, 511, 345/354, 650, 684, 838, 593, 594, 645, 810, 345/819, 820, 863; 715/530, 531, 539, 540, 715/515, 502

See application file for complete search history.

(56) References Cited

U.S. PATENT DOCUMENTS 5,459,865 A * 10/1995 Heninger et al. ............ 718/108
5,537,529 A * 7/1996 Borovoy et al. ............. 715/511
5,544,302 A * 8/1996 Nguyen ....................... 345/781
5,551,055 A * 8/1996 Matheny et al. .............. 710/62
5,574,846 A * 11/1996 Yoshimura et al. ......... 345/418
5,583,982 A * 12/1996 Matheny et al. ............ 395/326
5,604,853 A * 2/1997 Nagashima ................. 715/540
5,659,747 A * 8/1997 Nakajima .................... 395/651
5,701,137 A * 12/1997 Kiernan et al. .............. 345/853
5,754,174 A * 5/1998 Carpenter et al. ........... 345/810
5,757,372 A * 5/1998 Krause et al. ............... 345/348

(Continued)

FOREIGN PATENT DOCUMENTS

EP    0249089 A2 *    5/1987

OTHER PUBLICATIONS

Meng, Chii; Yasue, Motohiro; Imamiya, Atsumi; Mao, Xianoyang; "Visualizing Histories for Selective Undo and Redo"; IEEE; Jul. 15, 1998; pp. 1-5.*

(Continued)

*Primary Examiner*—Ella Colbert
(74) *Attorney, Agent, or Firm*—Fish & Richardson P.C.

(57) ABSTRACT

Methods and apparatus embodying techniques useful in systems for creating and modifying documents. A state history of a document for storing document states is maintained; and, whenever an interesting operation has occurred, the state of the document is automatically captured as it exists after the operation. The captured state is added to the state history. In another aspect, the techniques identify for a user on a display device a set of states that the document has been in by operation of the system; and enable the user to designate any arbitrary one of the identified states for further operations. The techniques may provide both linear and non-linear history.

44 Claims, 5 Drawing Sheets

U.S. PATENT DOCUMENTS

| | | | |
|---|---|---|---|
| 5,801,687 A * | 9/1998 | Peterson et al. | 345/302 |
| 5,828,375 A * | 10/1998 | Nomura et al. | 345/764 |
| RE36,145 E * | 3/1999 | DeAguiar et al. | 345/511 |
| 5,877,765 A * | 3/1999 | Dickman et al. | 345/738 |
| 5,890,181 A * | 3/1999 | Selesky et al. | 707/530 |
| 5,990,906 A * | 11/1999 | Hudson et al. | 345/439 |
| 6,002,402 A * | 12/1999 | Schacher | 345/352 |
| 6,008,807 A * | 12/1999 | Bretschneider et al. | 345/732 |
| 6,012,083 A * | 1/2000 | Savitzky et al. | 709/202 |
| 6,018,342 A * | 1/2000 | Bristor | 345/354 |
| 6,185,591 B1 * | 2/2001 | Baker et al. | 707/531 |
| 6,310,630 B1 * | 10/2001 | Kulkarni et al. | 345/776 |

OTHER PUBLICATIONS

Gama et al., Design Patterns Elements of Reusable Object-Oriented Software, "MEMENTO," Addison-Wesley Publishing Co., 1977, pp. 283-291.

Gamma et al., Design Patterns Elements of Reusable Object-Oriented Software, "COMMAND," Addison-Wesley Publishing Co., 1977, pp. 233-241.

T. Berlage, "A Selective Undo Mechanism for Graphical User Interfaces Based on Command Objects," ACM Transactions on Computer-Human Interactions, vol. 1, No. 3, Sep. 1994, pp. 269-295.

HTML pages from http://www.satoripaint.com relating to Satori Version 2.0 introduced Aug. 1997 (9 pages).

David Pogue, "Movieflo' 1.1," Jun. 1995 Magazine Review, Mac Publishing 1995, L.L.C., 2 pgs. downloaded from www.

Mark Christianson, "MovieFlo' 2.0," Jan. 1997 Magazine Review, Mac Publishing 1997, L.L.C., 2 pgs. downloaded from www.

"The VALIS Group Ships Metalfo'$^M$ 2.0 and Movieflo'™ 2.0 Freeform Plasticity™ Software for Macintosh," The VALIS Group, Press Relieses, 2 pgs., Apr. 1996, downloaded from www.

Tsikanovsky et al., "Movieflo' 2.0," The VALIS Group, Tiburon, CA., 17 pgs., 1996.

Kurlander, et al. "Editable Graphical Histories", IEEE Workshop on Visual Languages, Oct. 10-12, 1988, p. 127-134.

Myers, et al. "Reusable Hierarchial Command Objects", Proceedings of CHI 96 Human Factors in Computing Systems, Apr. 13-18, 1996, p. 260-267.

Berlage, "A Selective Undo Mechanism for Graphical User Interfaces Based on Command Objects", ACM Transactions on Computer-Human Interaction, vol. 1, No. 3, Sep. 1994, p. 269-294.

Hideyuki, "Undo Processing System in Data File Processor", Patent Abstracts of Japan, vol. 1996, No. 3, Mar. 29, 1996, 1 page.

Christodoulakis, et al. "Browsing Within Time-Driven Multimedia Documents", Proc. Conf. on Office Info. Sys., Mar. 23-25, 1988, p. 219-227.

Feiner, et al. "An Experimental System for Creating and Presenting Interactive Graphical Documents", ACM Trans. On Graphics, vol. 1, No. 1, Jan. 1982, p. 59-77.

* cited by examiner

MAINTAINING DOCUMENT STATE HISTORY

CROSS REFERENCE TO RELATED APPLICATIONS

Not applicable.

STATEMENT REGARDING FEDERALLY SPONSORED RESEARCH OR DEVELOPMENT

Not Applicable.

BACKGROUND OF THE INVENTION

The present invention relates to electronic systems operable under program control to create and edit electronic documents.

A conventional feature of computer program applications that create and edit documents is an undo command. Applications written for the Microsoft® Windows 95 operating system often use Ctrl-Z as a keyboard shortcut for the undo command.

One mechanism for implementing undo in applications is based on a command object that knows how to do, undo, and redo an operation. This is described, for example, in Gamma et al., Design Patterns, Addison-Wesley Publishing Co., © 1995, pages 233 to 242. Multiple undo may then be implemented by keeping a command history. Gamma notes on page 239 that such an implementation has a strong potential for error accumulation and recommends using the "memento" pattern as part of the command object. Some applications provide a user with a list of the most recent actions and allow the user to select one of the actions, thereby undoing the selected action and all actions above it (that is, all more recent actions) in the list.

A related feature available in some applications allows a user to save a document that is being edited and later revert to the saved version, thereby discarding intervening changes to the document.

The conventional behavior of an undo command restores the document to the state it had before the operation being undone was done.

SUMMARY OF THE INVENTION

In general, in one aspect, the invention provides methods and apparatus embodying techniques for performing operations on documents having states. The techniques include performing operations to maintain in a memory a state history of a document for storing document states; and, whenever an interesting operation has occurred, automatically capture the state of the document as it exists after the operation and adding the captured state to the state history.

In general, in another aspect, the techniques include operations to maintain a first history of interesting operations and a second history of all operations requested by a user, the second history but not the first history including operations global to the state of the application.

In general, in another aspect, the techniques include operations to receive from the user a sequence of commands to change the document; change the document state in response to each command; add the changed document state to a state history maintained in a computer-readable memory device each time the document state is changed; for each document state added to the state history, add a corresponding entry to a history list displayed to the user on a computer-controlled display device operated as part of a graphical user interface; and, in response to a user action stepping backward to an item in the history list, update the document to have the corresponding document state saved in the state history.

In general, in another aspect, the techniques include operations to keep a history list; go back to a previous state in the history list; select a future state from the history list, being a state created after the previous state, as a source of data for an operation; and perform the operation with the future data on the previous state.

In general, in another aspect, the techniques include operations to keep a history of document states created by a user; enable the user to discard any of the history; and enable the user to step backward and forward through the history and thereby to alter the state of the document to be any of the document states in the history.

In general, in another aspect, the techniques include operations to keep a history of document states created automatically whenever a user command to the application changes the state of a document; enable the user to discard any user-selected set of the document states in the history; and enable the user to designate any one of the document states in the history and thereby install the designated state as the current state of the document.

In general, in another aspect, the techniques include operations to create and modify a document; identify for a user on a display device a set of states that the document has been in by operation of the application; and enable the user to designate any arbitrary one of the identified states.

Particular implementations of the invention will have one or more of the following advantages. Use of a state history supports a quick and efficient multiple undo operation, particularly in the context of an application like a image editing application whose operations often act on an entire document. It enables a user to access prior states of a document randomly. It enables a prior state of a document to be turned into its own document. It provides a way to implement multiple undo efficiently while avoiding operation sequence dependencies. A large history of commands on a document may be navigated quickly and without increasing time cost for navigating over many commands. It somewhat simplifies treating multiple contiguous user commands—such as multiple commands moving the same object in an image—as a single command for undo purposes. Where revisions to one document may be made using data from another document, the invention provides a multiple undo feature without risk of inter-document dependencies.

Further advantages include the following. In a non-linear mode of operation, a user may edit a document starting from an earlier-captured document state without losing later-captured states. For example, using a digital painting application, a user may apply a series of filters to an image, then go back to the original image state, and then selectively paint in the effects of those filters using a history paintbrush tool. Use of a smooth-moving control interface element allows a user easily to scan through a document's history while viewing the history states as they are selected by the control, creating a movie-like presentation of at least a portion of the document creation and editing process.

Other features and advantages of the invention will become apparent from the following description and from the claims.

DETAILED DESCRIPTION

Figure 1:
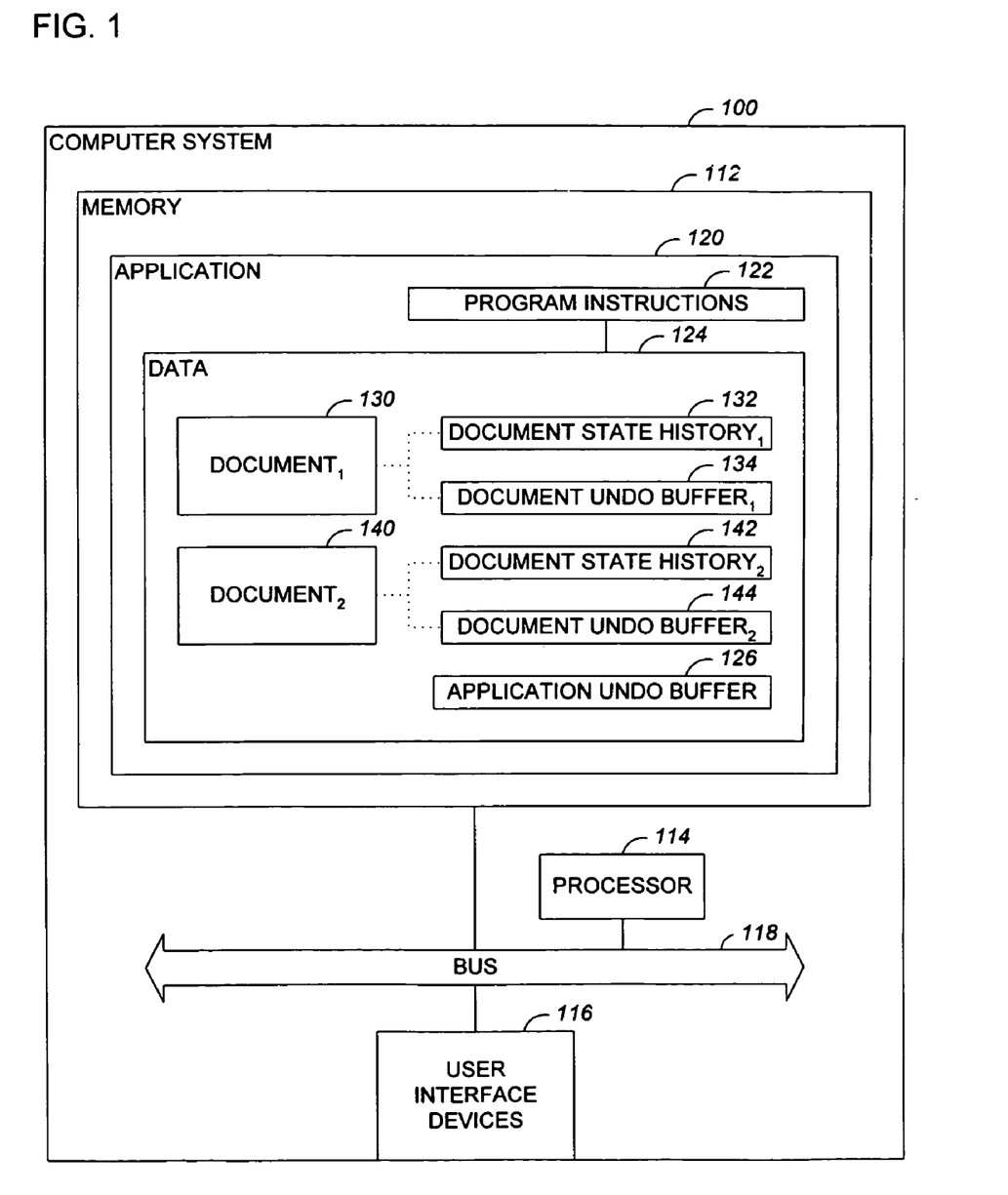
FIG. 1 is a schematic block diagram of a computer system running an application program in accordance with the invention.

As shown in FIG. 1, a conventional programmable computer system 100 has at least a processor component 114 capable of executing computer program instructions, a memory component 112 for storing programs and data, and a user interface device or devices 116 by which a person—a user—may interact with programs running on the system 100. These and other components are connected to interact with each other by one or more buses 118. The memory component will generally include a volatile random access memory (RAM), a non-volatile read-only memory (ROM), and one or more large disk drives. The system may run one or more programs. Application 120 is a computer program designed for a particular task, and, as is typical, it acts on a central depository called a document, whose content a user creates and edits. Some applications, as illustrated, may allow a user to have more than one document, such as documents 130 and 140, open at a time, and allow the user to select one or the other of them as the active document that is the focus or target of editing and other document-directed actions.

A document is typically displayed in a rectangular region of the display screen called a document window. A spreadsheet application displays a spreadsheet document designed to look and act like a 2-dimensional table. A word-processing application displays a document designed to look like a sheet of paper. An image processing application displays a document designed to look like a photograph or a drawing.

As is conventional, application 120 is illustrated as having program instructions 122 that may be executed to operated on data 124. Application 120 is programmed to implement a state history feature, and so associates with each open document 130 and 140 a corresponding state history 132 and 142 and a corresponding undo buffer 134 and 144, respectively. The application also has an undo buffer 126 for the application itself. In an alternative implementation, the application undo buffer is the only undo buffer and the commands stored there include a reference to the relevant document, if any. If the application undo buffer contains a command to undo, then all of the document undo buffers should be empty, to maintain intuitive operation of the undo-redo feature.

Figure 2:
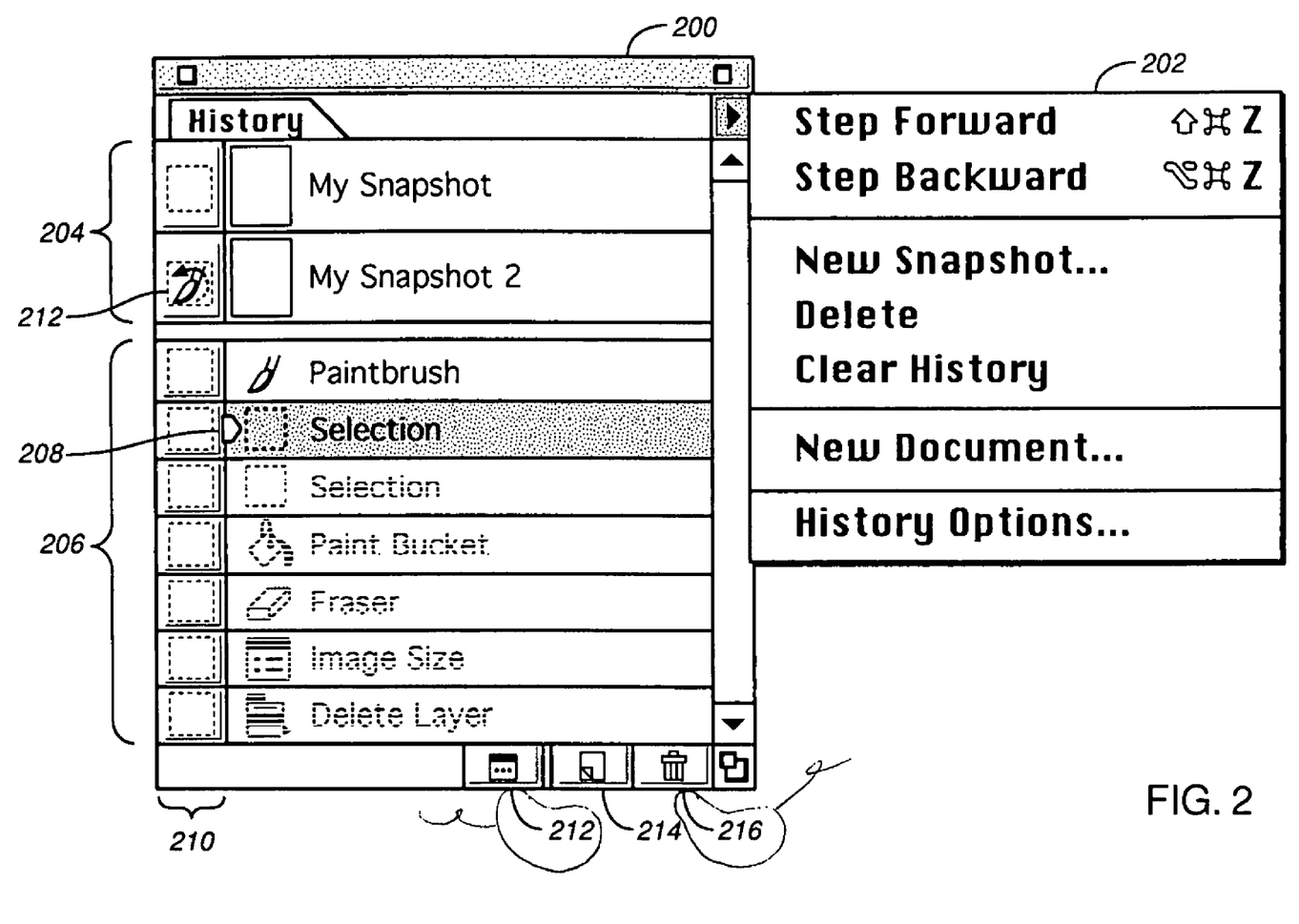
FIG. 2 shows a history palette user interface element of an implementation of the invention.

As shown in FIG. 2, an application implementing a history list provides, as part of a graphical user interface, a floating history palette 200 that a user may show or hide with menu commands or other user interface commands. Pertinent aspects of the operation of the application will now be described in terms of the information made available on the history palette 200 and the operations a user may perform using the history palette.

When a document is opened or newly created, the application generates a snapshot of the document and updates the snapshot or upper region 204 of the palette with a thumbnail image representing the snapshot and the name of the snapshot, which the user may edit. The lower portion 206 of the palette is initialized with an item named "Open" or "New", for the initial document state, so that the user will be able to step backward from his or her first state-changing operation. (This may be viewed as characterizing opening and creating a document as "interesting" operations, as described below.) The history palette 200 is associated with a particular document. If the user has two documents 130 and 140 (FIG. 1) open, each will have a separate history palette, and the history palette shown when one of the documents is active will reflect the state history 132 or 142, respectively, of the corresponding document 130 or 140.

Viewing parameters, such as a viewing magnification, which affect how the application displays the document but do not affect the actual document data, may be considered interesting in a particular implementation. For example, a viewing parameter that applies to all views of a document may well be treated as interesting and considered part of the state of the document; whereas, if the document can be viewed in multiple open windows with a viewing parameter that can be set differently for each view, the parameter would more naturally not be considered interesting or part of the document state.

The state of the document is recorded in the state history after the user makes a change to the document that changes the state of the document. The application may—implicitly or expressly—categorize commands into those that change the document state (the "interesting" ones) and those that do not. As an example, some commands, such as successive, consecutive commands moving a single object, may be interesting only in the aggregate, when they have been collapsed into a single move-object command. As another example, some commands are global, such as a change to a palette or to preferences, in that they change the state of the application, and are not made to a particular document.

When a document state is recorded, it is appended as an item at the end of the history list portion 206. Each item has an icon and a brief textual description of corresponding command. The icon shows the tool used to perform the command or, for menu and dialog commands, it is a menu or dialog icon. Both the upper portion 204 and the lower portion 206 are specific to the current document and will change when a different document is made active.

The user may grab a small control 208 on the left side of the palette and drag it up and down to cause states of the document to be displayed, according to the position of the control. Doing so causes the current state—the one being displayed as a result of the dragging action—to be highlighted and those after it to be dimmed. In FIG. 2, the state corresponding to the second history list item, "Selection", is highlighted, and those following it are dimmed. Other user interface gestures, such as clicking on an item, will have the same effect. If the user then begins to alter the document, all items in the history list 206 below the selected item will be deleted. (An alternative and more powerful mode of operation—non-linear history mode—will be described later.)

The leftmost column of the floating palette has buttons 210 that may be selected to establish the corresponding state—whether a state in the state history or a snapshot—as the state that will be used as a source state by history-based tools. Such a selection is recorded on the palette with an icon to mark the selected state. As illustrated, a history paintbrush icon is used to indicate that the corresponding state will be used when a history paintbrush tool is used on the active document. If no more than one state may be selected as a source for history-based tools, the buttons 210 will behave like radio buttons, in that selecting one state will deselect any other selected state. As will be described, both earlier and later document states (that is, both items above and below the current state item in the history list) may be selected as a history source.

The history paintbrush tool may be selected from a tool palette like any of the other tools that the user may select to perform operations on a document. In operation, the history paintbrush operates to paint on a target document input from the source. In an image application, the input may be pixel data, blending modes, clipping paths, or any other data that is part of the source document state. The semantics of the tool may—but need not—require the source to be a state (present, past, or future) of the target document; alternatively, the semantics may permit a tool to use as a source a state derived from a document entirely independent from the target document.

The history palette 200 may also be used as a source for a drag and drop command. When the user grabs an item on the palette and drags it to another document, the source state (the document state corresponding to the drag item) will be applied to the targeted document. The semantics of applying a state to a document are application specific, and may depend on the nature of the source state. (For example, it may be a complete document state, such as is found in the state history, or it may be a partial state, such as is captured when a snapshot is taken of a single layer of an image document.) In the semantics of one implementation, to apply a complete document state appends the source state to the history list and installs it as the current state of the target document. If the source is a partial state such as an image layer, it could be added as a layer to the target document. Alternatively, even a complete source image document could be flattened to a single layer and added to the target document.

The history palette also has a pop-up menu 202. This menu provides commands to step forward through a history list, to step backward through a history list, to create a new snapshot, to delete a history or snapshot item, to clear the history list 206 (and corresponding state history), to create a new document from a saved document state, and to set options for the history features.

The step forward and step backward commands enable the user to walk backward and forward through the current history list 206, as was described earlier in reference to control 208.

A user may create a snapshot of any point in the document's history either by using the new-snapshot command in the pop-up menu 202 or by using the command button 214 in the palette. For example, a user may select a history state by moving control 208 to the corresponding list item and then selecting snapshot button 214, which will bring up a dialog window for the user to name the snapshot and optionally set snapshot control options. In particular, the user may choose to snapshot a full document from the state, a composition of all the layers of the document state, or the current layer as it exists in the selected document state. An item for the newly created snapshot will be appended to the upper list 204 of the palette.

As has been mentioned, the features associated with the history palette 200 operate differently in non-linear history mode from what has been described above in two important respects. In non-linear history mode, deleting an item from the history list 206 does not cause the items below the deleted item to be deleted. Because the later document states are complete in themselves, earlier ones may be deleted with no adverse effect. Also, in non-linear history mode, a user may step backward to an earlier document state, begin working from there, and not cause the later document states to be deleted. Rather, the new document states are added to the end of the history list, which as a result will show two branches of state history.

Operation of the history palette records some, but not all, changes made by a user. Changes that are local to the document will be recorded, while changes that are global to the application will not be recorded. A global change, like changing a setting for a tool, will not cause a document state to be saved in a state history or an item to be added to the history list, because the document state has not been changed and therefore any previously captured state is still the state of the document. On the other hand, a local change, like creating or modifying a document path, layer, or channel, will cause a document state to be saved and an item to be added to the history list.

In conjunction with the history palette, it remains useful to have a conventional undo-redo feature that allows a user to undo and redo the most recent command without regard to whether it was local or global. This is accomplished by saving an undo item for the most recent user command in a document-specific buffer and applying the undo menu command or its keyboard shortcut as a toggle to undo and redo the operation.

Figure 3:
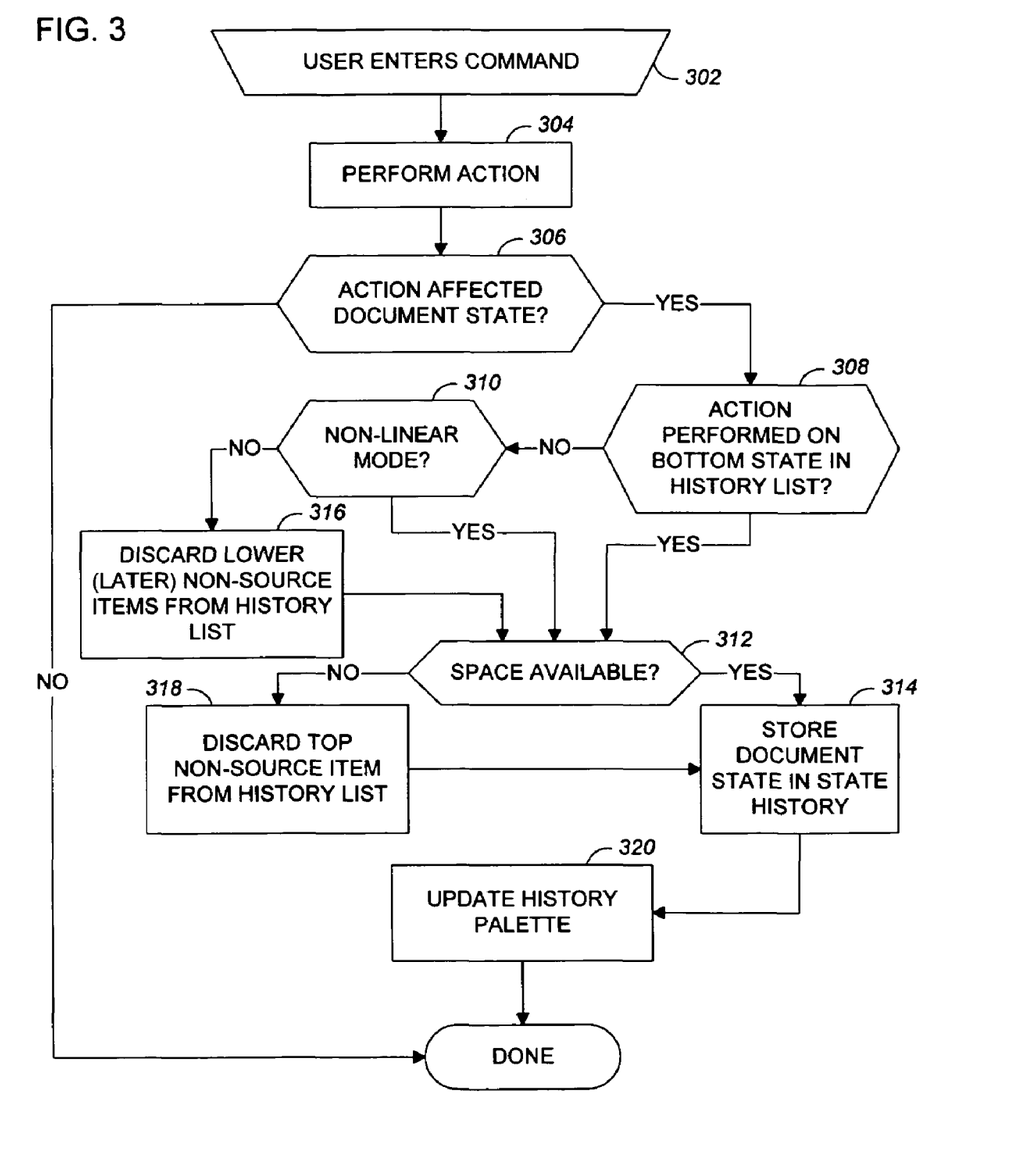
FIG. 3 is a flowchart of steps performed by an application operating in accordance with the invention.
Figure 4:
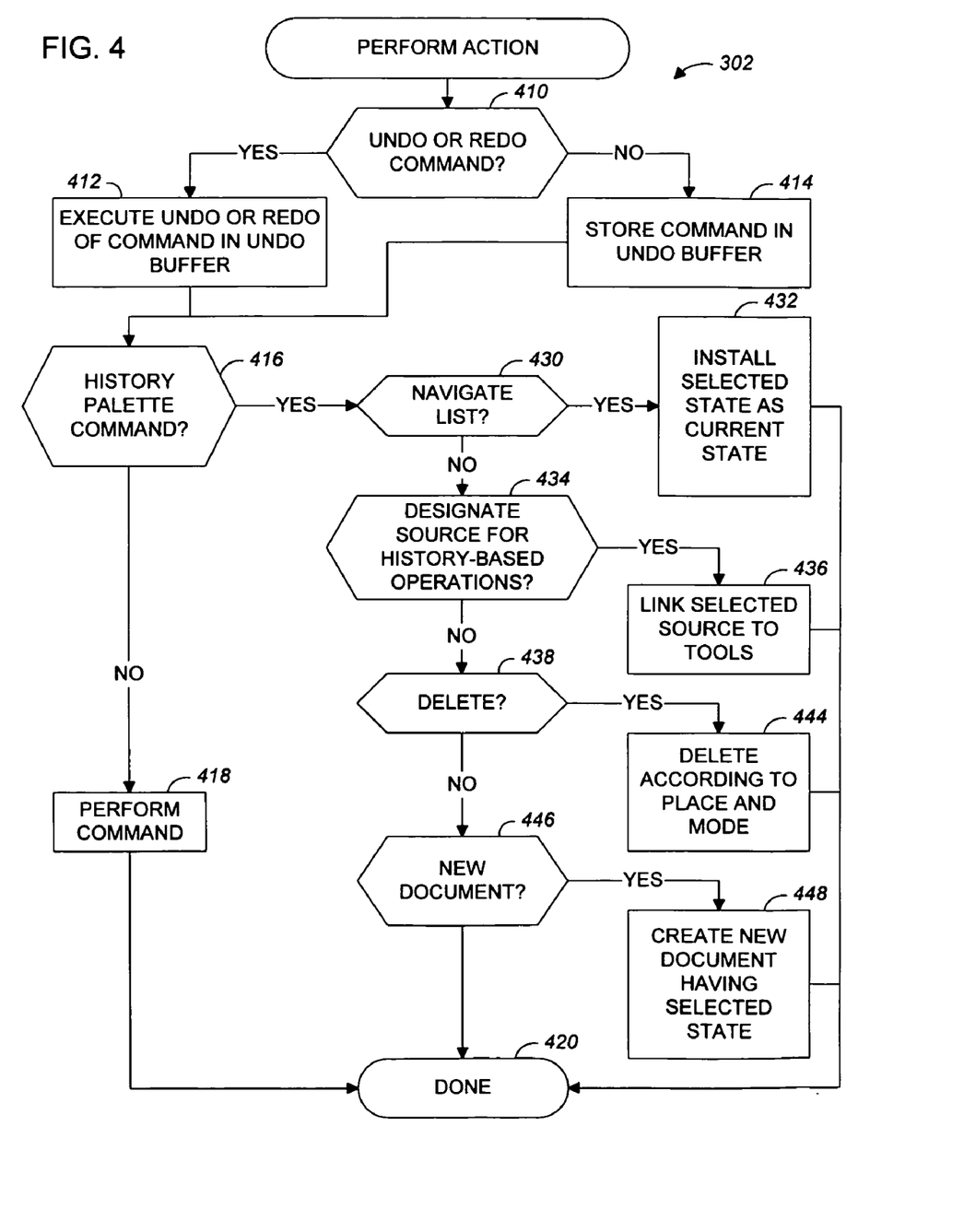
FIG. 4 is a flowchart elaborating on FIG. 3.

FIG. 3 and FIG. 4, along with the accompanying description, are intended to explain the operation and use of the state history feature so that they may be readily understood, and so details of implementation and optimization are omitted. A practical implementation of the pertinent command dispatch and processing functions would be expected to combine and reorganize the illustrated steps and implement them in accordance with well-understood software engineering techniques.

As shown in FIG. 3, the operation of an implementation of the state history feature may be seen to begin when a user enters a command (step 302). A command is a request made by the user to the application, through a graphical user interface, for example, to change the state of the application or the state of the active document. The application performs the corresponding action (step 304, which will be elaborated in reference to FIG. 4). If the action is one categorized as not affecting the state of a document (the no branch of decision step 306), the state history and history list are unaffected. Otherwise, if the action of the command was performed with the document in the state of the temporally most recent entry in the history list, which corresponds to the temporally most recent state in the state history, the state of the document after the action is stored in the state history and the history list on the history palette is updated (the yes branch of step 308, and steps 312, 314, and 320). On the no branch of step 308, if non-linear history mode is in effect, nothing is discarded from the history list or the state history merely because an interesting command has been entered (the yes branch of step 310). In linear history mode (the no branch of step 310), the history list items below the current state item and the corresponding states in the state history are discarded (step 316), other than any item selected as a source for history-based tools, such as the history paintbrush (see description of buttons 210, above).

If the maximum size of the history list or state history had been reached, the top (earliest) item from the history list—excluding any item selected as a source for history-based tools—is discarded, along with its corresponding document state in the state history, before the new document state is stored (the no branch of step 312 and step 318).

To produce a practical implementation, it is advantageous to store document states in a form that allows a great deal of sharing between saved states, to keep to a minimum the amount of memory consumed in storing redundant information, and the processor resources consumed in writing and reading it. A data representation suitable for this purpose is described in commonly-owned U.S. Pat. No. 5,905,506 to Hamburg for "Shared Tile Image Representations", the disclosure of which is incorporated here by this reference.

Referring to FIG. 4, aspects of the perform action step (step 304, FIG. 3) pertinent to an implementation of a state history feature will now be described. If the user's command is not an undo or a redo, that is, not the Ctrl-Z toggle, the command is stored in an undo buffer associated with the active document (step 414), such as buffers 134 and 144 of FIG. 1 (the yes branch of decision step 410 and step 412). If the command is an undo or a redo, the undo or redo operation of the command in the undo buffer is executed (step 412). It should be noted that the history-related commands, and in particular changes to the history list and the state history, can be subject to the conventional undo and redo (step 412). The provides an advantageous and elegant user interface that allows, for example, a user to toggle between two document states previously selected from anywhere in the state history with a single repeated keystroke.

Returning to FIG. 4, the next pertinent step considers whether the command relates to the history list or the history palette. If not, the command is performed (step 418) and operation continues (step 420) with decision step 306 (FIG. 3). Otherwise, the command is one that uses the history list (the yes branch of decision step 416), and the processing of it will now be described.

If the command navigates the history list—for example, a step backward command, step forward command, or list item selection command—the document state corresponding to selected item is installed as the current state of the active document (steps 430 and 432).

If the command designates a source for history-based commands—for example, a command selecting a column 210 button to designate a source for the history paintbrush—the targeted history state is linked as the source document to the tools that can take a source document state as an input (steps 434 and 436). The history-based commands that may be implemented in a painting application include the history paintbrush, which paints from the source state onto the active document; a fill-from-history command that performs a fill operation on the active document with input from the source state; and an eraser that erases the active document to the source state. As has been mentioned, the source state may be either earlier or later than the current state, enabling a user to paint from either the future or the past.

Figure 5:
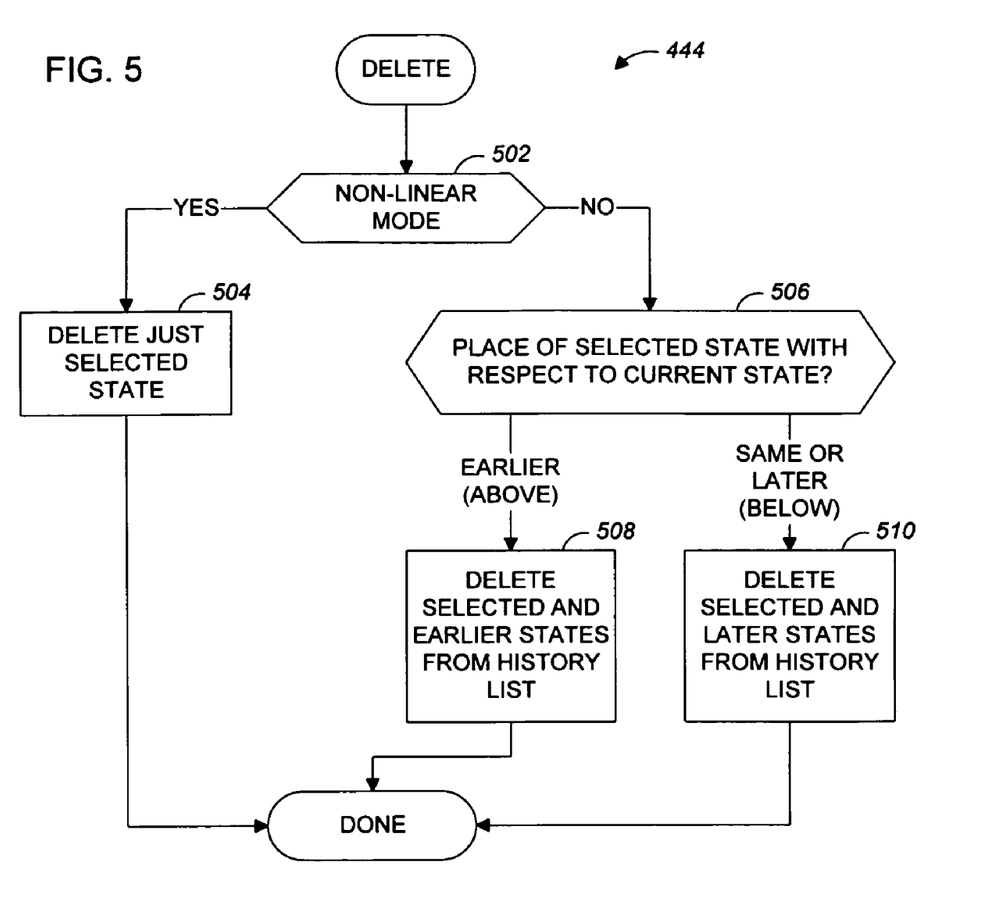
FIG. 5 is a flowchart elaborating on FIG. 4.

If the command deletes a history list item (the yes branch of step 438), the behavior depends on whether the operating mode is linear history mode or non-linear history mode and where in the history list the selected item falls (step 444). As shown in FIG. 5, in non-linear history mode, only the selected item and its document state are deleted (the yes branch of decision step 502 and step 504). Otherwise, the position of the selected item with respect to the current state of the document is considered (step 506). If the selected item is below (was created later than) the current state or the same as the current state, both the selected item and its state, and any later items (below the selected item in the history list) and their states are also deleted (step 510). If the selected item is above (was created earlier than) the current state, both the selected item and its state, and any earlier items (above the selected item in the history list) and their states are also deleted (step 508). Where a range of states is deleted (steps 508 and 510), a special check is made not to delete any item selected as a source for history-based tools.

Returning to FIG. 4, if the command creates a new document (the yes branch of decision step 446), the initial state of the new document is copied from the document state in the state history corresponding to the selected history list item (step 448).

A clear history command may also be implemented, with which a user may delete all non-snapshot states other than the current state and any history paintbrush source state.

A state history feature is particularly advantageous in an image manipulation application, such as the Photoshop® program available from Adobe Systems Incorporated of San Jose, Calif. In this application, each document is, as is typical, a single-page image that is generally viewed as a whole by the user in the process of creation and editing. This application has many powerful painting and selection tools, supports multiple layers, each with multiple channels, special effects filters, and lighting effects. In this sophisticated environment, the state history feature with its non-linear operating mode is particularly advantageous, in that it permits a user to step backward and forward through a set of states, picking up effects from a future state and applying them to a past state to create a new branch of development of an image.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Other embodiments are within the scope of the following claims. For example, the order of performing steps of the invention may be changed by those skilled in the art and still achieve desirable results. Forms of user interface other that a list on a palette to show state history may be used, such as a stack of items or a pull-down or pop-up menu, and that revision branches created in non-linear history mode may be shown as a tree or other representation of an directed acyclic graph. To satisfy user preferences for how an undo-redo feature or a state history feature should behave in a particular application, the application may be implemented to treat selected commands or operations as not interesting and therefore not captured in an undo buffer or a state history, to conform the design of the user interface of the application to user expectations. The user interface aspects of the invention may be embodied using methods of preserving document state information other than storing an entire state, for example, by storing state differences or even command histories.

What is claimed is:

1. A method implemented in a computer program application performing operations on documents having states, the method comprising:
the application maintaining in a memory a state history of a document; and
whenever an interesting operation has occurred, an interesting operation being an operation by the application that changes the state of the document in response to a user command, automatically capturing the state of the document as it exists after the operation and adding the captured state to the state history of the document, the captured state of the document being complete in itself in the sense that earlier document states in the state history of the document can be deleted without adverse effect on later document states.

2. The method of claim 1, wherein the memory comprises a disk file.

3. The method of claim 1, further comprising:
maintaining in the state history the order in which the stored states were automatically added to the state history; and
displaying the state history to a user as a list of document states shown in their stored order.

4. The method of claim 3, wherein:
the list of document states displayed to the user comprises a list of items, each item representing a state of the document that existed after an interesting operation and that can be recovered directly by selecting the item.

5. The method of claim 4, further comprising:
providing a tool operable under user control to obtain source material from any state in the state history and apply it to a current state of the document, where the document is a raster image.

6. The method of claim 4, further comprising:
enabling a user to select any item in the displayed list of items and cause the application to create a new document having the document state corresponding to the selected item.

7. The method of claim 4, wherein:
each of the captured states in the state history maintains the state data in essentially its original form, whereby the captured state data is suitable for immediate use in other operations.

8. The method of claim 3, further comprising:
establishing as the current state of the document a state stored in the state history.

9. The method of claim 1, further comprising:
maintaining in memory a history of all operations requested by a user, including operations global to the state of the application.

10. A computer-implemented method of interacting with a user editing a document in a computer program application, the document having a document state, the method comprising:
receiving from the user a sequence of commands to change the state of the document;
changing the document state in response to each command;
adding the changed document state to a state history maintained by the application in a computer-readable memory device each time the document state is changed, the changed document state being complete in itself in the sense that older document states in the state history of the document can be discarded without adverse affect on the added document state;
for each document state added to the state history, adding a corresponding entry to a history list displayed to the user on a computer-controlled display device operated as part of a graphical user interface; and
in response to a user action, selecting an item in the history list and establishing the document state corresponding to the selected item in the history list as the current state of the document.

11. The method of claim 10, wherein:
the state history and the history list are limited to storing a preset number of items and excess items are scrolled off the top of the list as new items are added.

12. The method of claim 10, wherein:
the state history is stored in a region of memory and the oldest document states in the state history are discarded when free space in the region runs low.

13. The method of claim 12, wherein:
the oldest document states are found and discarded by a memory management process.

14. The method of claim 10, further comprising:
in response to a user command to change the document state corresponding to the selected item in the history list and established as the current state of the document, deleting the items after the selected item in the history list and the corresponding document states from the state history.

15. The method of claim 10, further comprising:
in response to a user command to change the document state corresponding to the selected item in the history list and established as the current state of the document, maintaining the items after the selected item in the history list and adding a new item to the end of the history list and a new document state to the state history.

16. The method of claim 10, further comprising:
enabling a user interface gesture on the history list to create a new document from a document state from the state history.

17. A method implemented in a computer program application operable to create and edit a document, comprising:
maintaining in a memory a state history of a document, each state in the state history being complete in itself in that any state in the state history can be deleted without adverse affect on other states;
in response to a user action, selecting a first state from the state history and establishing the first selected state of the document as the current state of the document;
in response to a user action, selecting a second state from the state history, the second state being a state created after the first state, as a source of data for an operation; and
performing the operation with the data from the second state on the first state to create a third state.

18. A method implemented in a computer program application operable to create and edit a document, comprising:
keeping a history of document states of a document, the history being kept by the application, the document states being created automatically by the application whenever a user command to the application changes the state of the document, the document states being complete in themselves;

enabling the user to discard any of the states in the history to create a revised history; and enabling the user to step backward and forward through the revised history and alter the state of the document to be any of the document states in the revised history.

19. A method implemented in a computer program application operable to create and edit a document, comprising:

keeping a history of document states of a document, the history being kept by the application, the document states being created automatically by the application whenever a user command to the application changes the state of the document, the document states being complete in themselves;

enabling the user to discard any of the states in the history to create a revised history; and enabling the user to designate any one of the document states in the revised history and establish the designated state as the current state of the document.

20. The method of claim 19, further comprising:

saving the history when the document is closed on a long-term storage medium, whereby the history may be restored when the document is later opened and across invocations of the application.

21. The method of claim 20, wherein:

the saved history resides in the document with final document data.

22. The method of claim 20, wherein:

the saved history resides in a long-term data repository independent of the original document.

23. A method enabling a user to control operation of a computer program application for creating and modifying a document, the method comprising:

Identifying for the user on a display device a set of states that the document has been in by operation of the application, each state being complete in itself in the sense that any earlier state in the set of states can be deleted without adverse affect on later document states; and enabling the user to designate any one of the identified states as a document state operand.

24. The method of claim 23, further comprising:

displaying the document in a user interface window, the document being a digital image.

25. The method of claim 24, wherein the digital image has a plurality of layers, each of the plurality of layers having a plurality of channels, the method further comprising:

displaying user-interface elements for applying filters to the digital image.

26. The method of claim 23, further comprising:

establishing the designated state as the current state of the document in response to a user command.

27. The method of claim 26 wherein the designation and establishment are performed in response to a single command.

28. The method of claim 26 wherein the set of states is displayed in an order, the method further comprising:

enabling the user to make a gesture on a user interface indicating a sequence of displayed state identifiers and responding to the gesture by displaying the document in the states indicated as the gesture is made.

29. The method of claim 28 wherein the set of states is displayed in order of creation of the states in the set.

30. The method of claim 28 wherein the document is a digital image.

31. The method of claim 26 further comprising:

enabling the user to modify the document state after the establishing step; and adding the document state resulting from the modification to the set of states identified on the display device.

32. The method of claim 26 further comprising:

providing a step backward and a step forward command for the user to execute to navigate the set of states; and providing a separate undo and redo command for the user to undo and redo commands entered by the user.

33. The method of claim 23, further comprising:

providing the user a delete tool for deleting the designated state from the set of states.

34. The method of claim 23, wherein:

the set of states is identified by displaying a scrollable list of elements each identifying one of the states in the set.

35. The method of claim 34 wherein the list elements are ordered by the time the corresponding states were created.

36. The method of claim 23, further comprising:

providing a step backward and a step forward command for the user to execute to navigate the set of states; and providing a separate undo and redo command for the user to undo and redo commands entered by the user.

37. The method of claim 36, further comprising:

providing to the user a first undo command function that operates with reference to the first history and a second undo command function that operates with reference to the second history.

38. A computer program product comprising a computer-readable storage medium tangibly embodying program instructions defining a computer program application for performing operations on documents having states, the program comprising instructions operable for causing a programmable processor to:

maintain in a memory a state history of a document by the application; and whenever an interesting operation has occurred, an interesting operation being an operation by the application that changes the state of the document in response to a user command, the state being complete in itself and independent of other states, automatically capture the state of the document as it exists after the operation, the captured state of the document being complete in itself in the sense that earlier document states in the state history of the document can be deleted without adverse affect on later document states, and add the captured state to the state history of the document.

39. The computer program product of claim 38, further comprising instructions operable for causing a programmable processor to:

maintaining in memory a history of all operations requested by a user, including operations global to the state of the application.

40. A computer program product comprising a computer-readable storage medium tangibly embodying program instructions for interacting with a user editing a document in a computer program application, the document having a document state, the computer program product comprising instructions operable for causing a programmable processor to:

receive from the user a sequence of commands to change the state of the document;

change the document state in response to each command;

add the changed document state to a state history maintained by the application in a computer-readable memory device each time the document state is changed, the changed document state being complete in itself in the sense that older document states in the state history of the document can be discarded without adverse affect on the added document state;

for each document state added to the state history, add a corresponding entry to a history list displayed to the user on a computer-controlled display device operated as part of a graphical user interface; and in response to a user action, select an item in the history list and establish the document state corresponding to the selected item in the history list as the current state of the document.

41. A computer program, residing on a computer-readable medium, comprising instructions for causing a computer to:

keep a state history of a document, each state in the state history being complete in itself in that any state in the state history can be deleted without adverse affect on other states;

in response to a user action, select a first state from the state history and establish the first selected state of the document as the current state of the document;

in response to a user action, select a second state from the state history, the second state being a state created after the first state, as a source of data for an operation; and perform the operation with the data from the second state on the first state to create a third state.

42. A computer program, residing on a computer-readable medium, comprising instructions for causing a computer to:

keep a history of document states by the application, the document states being created automatically by the application whenever a user command to the application changes the state of a document, the document states being complete in themselves in the sense that earlier document states in the history can be deleted without adverse affect on later document states;

enable the user to discard any of the states in the history to create a revised history; and enable the user to step backward and forward through the revised history and alter the state of the document to be any of the document states in the revised history.

43. A computer program, residing on a computer-readable medium comprising instructions for causing a computer to:

keep a history of document states by the application, the document states being created automatically by the application whenever a user command to the application changes the state of a document, the document states being complete in themselves in the sense that earlier document states in the history can be deleted without adverse affect on later document states;

enable the user to discard any of the states in the history to create a revised history; and enable the user to designate any one of the document states in the revised history and establish the designated state as the current state of the document.

44. A computer program, residing on a computer-readable medium, comprising instructions for causing a computer to:

create and modify a document;

identify for a user on a display device a set of states that the document has been in by operation of the application, each state being complete in itself in the sense that any earlier state in the set of states can be deleted without adverse affect on later document states; and enable the user to designate any one of the identified states.

\* \* \* \* \*

UNITED STATES PATENT AND TRADEMARK OFFICE
CERTIFICATE OF CORRECTION

| | |
|---|---|
| PATENT NO. | : 7,062,497 B2 |
| APPLICATION NO. | : 09/010801 |
| DATED | : June 13, 2006 |
| INVENTOR(S) | : Mark Hamburg et al. |

It is certified that error appears in the above-identified patent and that said Letters Patent is hereby corrected as shown below:

IN THE CLAIMS:
Claims 39 should read as follows:

39. The computer program product of claim 38, further comprising instructions operable for causing a programmable processor to:
    maintain in memory a history of all operations requested by a user, including operations global to the state of the application.

Signed and Sealed this

Nineteenth Day of September, 2006

JON W. DUDAS
*Director of the United States Patent and Trademark Office*